United States Patent [19]
Usami et al.

[11] Patent Number: 4,869,938
[45] Date of Patent: Sep. 26, 1989

[54] POLYPROPYLENE SHEET FOR PRESS-THROUGH PACKAGES, PRODUCTION PROCESS THEREOF, AND POLYPROPYLENE RESIN COMPOSITION

[75] Inventors: Katsuyuki Usami; Toru Ueki, both of Yokohama; Hajime Sentoku, Tokyo; Takashi Takahashi, Kamakura; Kazuharu Kanezaki, Yokohama, all of Japan

[73] Assignee: Mitsui Toatsu Chemicals Inc., Tokyo, Japan

[21] Appl. No.: 899,491

[22] Filed: Aug. 22, 1986

[51] Int. Cl.$^4$ .............................................. B29D 22/00
[52] U.S. Cl. .................... 428/34.3; 428/516; 525/240; 264/346; 264/348; 206/531; 206/532
[58] Field of Search ................ 206/531, 532; 428/35, 428/516, 34.3; 525/240; 264/346, 348

[56] References Cited

U.S. PATENT DOCUMENTS

Re. 29,705  7/1978  Compere ........................ 206/531
3,386,645   6/1968  Powell .......................... 428/35
3,456,038   7/1969  Newman et al. .................. 525/240

FOREIGN PATENT DOCUMENTS 185635 10/1983 Japan.

Primary Examiner—Edith Buffalow
Attorney, Agent, or Firm—Schmeiser, Morelle & Watts

[57] ABSTRACT

Disclosed herein is a polypropylene sheet obtained by forming a resin composition, which contains a polypropylene resin and a hydrogenated petroleum resin in specific amounts, into a sheet at a particular chill-roll temperature and then annealing the sheet at a specific temperature for a specific period of time as well as an improved production process of such a polypropylene sheet. Also disclosed is a polypropylene sheet comprising a sheet obtained from the above resin composition and a polypropylene layer of at least 10 μm thick applied on at least one side of the sheet. A polypropylene resin composition suitable for the production of such polypropylene sheets is also disclosed. The above polypropylene sheets are suitable for use in press-through packages.

25 Claims, No Drawings

POLYPROPYLENE SHEET FOR PRESS-THROUGH PACKAGES, PRODUCTION PROCESS THEREOF, AND POLYPROPYLENE RESIN COMPOSITION

BACKGROUND OF THE INVENTION:

1. Field of the Invention:

This invention relates to polypropylene sheets for press-through packages employed for packing medicines in the form of tablets, capsules or the like (hereinafter abbreviated as "PT packages" for the sake of brevity), said sheets having excellent transparency, thermoformability and safety, their production process, and polypropylene resin compositions suitable for their production.

2. Description of the Prior Art:

"PT packages" means one form of packages, in which tablets, capsules or the like are separately filled in pockets of a plastic sheet and then sealed with an aluminum foil. They are usually obtained by means of an automatic high-speed packing machine which can continuously perform such steps as thermally forming a thermoplastic sheet, automatically filling tablets, capsules or the like in the thus-formed sheet, sealing them with an aluminum foil, forming perforations or slits and then punching along the contours of intended PT packages.

Hard vinyl chloride resin sheets (hereinafter abbreviated merely as "PVC sheets" for the sake of brevity) have been primarily used for PT packages. The water vapor permeability of PVC sheets are however too large for medicines prone to property changes by moisture such as aspirin, antibiotics and the like. There are thus employed after laminating a resin having still smaller water vapor permeability such as polyvinylidene chloride or the like, leading to a drawback that their product cost is high. It has hence been desired to develop resin sheets having economical prices and smaller water vapor permeability and suited for PT packages.

Although polypropylene sheets have water vapor permeability smaller than PVC sheets, they have problems in transparency and thermoformability and under the circumstances, are not substantially employed in PT packages.

As a method for improving the transparency of polypropylene sheets, it has been known to add a nucleating agent such as dibenzilidine sorbitol or the like to a polypropylene resin. On the other hand, as a method for improving the thermoformability, it has also been known to blend a polyethylene resin with a polypropylene resin. However, these methods have some demerits. For example, the former method results in poor formability while the latter method leads to inferior transparency. It is hence improper to use such resins for PT packages.

As a method for improving both transparency and thermoformability of polypropylene sheets at the same time, it has been reported to blend a hydrogenated petroleum resin with a polypropylene resin (Japanese Patent Laid-Open No. 185635/1983). Polypropylene sheets obtained by this method are suited for PT packages as far as their mechanical and optical properties are concerned. However, they are extracted considerably with normal heptane (hereinafter abbreviated as "n-HT") and many of them do not meet the standard (not more than 150 ppm) of Notification No. 20 of the Ministry of Health and Welfare, Japanese Government. Under the circumstances, they are not usable practically.

SUMMARY OF THE INVENTION:

The first object of this invention is to provide a polypropylene sheet for PT packages, which undergoes a low degree of extraction with n-HT and has good transparency and mechanical properties.

The second object of this invention is to provide a process for the production of a polypropylene sheet for PT packages, which undergoes a low degree of extraction with n-HT and has good transparency and mechanical properties.

The third object of this invention is to provide a polypropylene resin composition suitable for the production of a polypropylene sheet for PT packages, which sheet undergoes a low degree of extraction with n-HT and has good formability, transparency and mechanical properties.

The first object of this invention can be achieved by the following polypropylene sheets for PT packages:

A polypropylene sheet for press-through packages, said sheet being obtained by forming a polypropylene resin composition, which contains 3–20 parts by weight of a hydrogenated petroleum resin per 100 parts by weight of a polypropylene resin, into a sheet at a chill-roll temperature of at least 70° C. and then annealing the sheet at a temperature of 50°–130° C. for at least 30 minutes.

A polypropylene sheet for press-through packages, said sheet being obtained by covering with a polypropylene layer of 10 μm thick or greater at least one side of a sheet obtained from a polypropylene resin composition containing 3–20 parts by weight of a hydrogenated petroleum resin per 100 parts by weight of a polypropylene resin.

The second object of this invention can be attained by the following production processes of polypropylene sheets for PT packages:

A process for the production of a polypropylene sheet for press-through packages, which comprises forming a polypropylene resin composition, which contains 3–20 parts by weight of a hydrogenated petroleum resin per 100 parts by weight of a polypropylene resin, into a sheet at a chill-roll temperature of at least 70° C.

A process for the production of a polypropylene sheet for press-through packages, which comprises extruding a polypropylene resin composition composed of 100 parts by weight of a polypropylene resin and 3–20 parts by weight of a hydrogenated petroleum resin and then annealing the extrudate at a temperature of at least 50° C. for at least 30 minutes.

The third object of this invention can be fulfilled by the following polypropylene resin compositions:

A polypropylene resin composition for press-through packages, comprising 3–20 parts by weight of a hydrogenated petroleum resin having a softening point of at least 124° C. per 100 parts by weight of a polypropylene resin.

A polypropylene resin composition for press-through packages, comprising 3–20 parts by weight of a hydrogenated petroleum resin and 0.05–1 part by weight of fine silica powder, both, per 100 parts by weight of a polypropylene resin.

Detailed Description of the Invention:

In the present invention, it is possible to use, as a polypropylene resin, a homopolypropylene or a random copolymer of propylene and an α-olefin such as ethylene or butene-1. Among these polypropylene resins, those having a melt flow index (hereinafter abbreviated as "MI", unit: g/10 min.) in the range of 1-4 as measured according to ASTM D-1238 are preferred. Among the above-described polypropylene resins, homopolypropylene resins are preferred for their well-balanced transparency and formability. Any MI smaller than 1 leads to poor transparency, whereas any MI greater than 4 results in resins which are sticky upon their forming under heat and have poor formability.

Hydrogenated petroleum resins useful in the practice of this invention include hydrogenated aromatic hydrocarbon resins, hydrogenated terpene resins, etc. As specific hydrogenated petroleum resins, may be mentioned those obtained by hydrogenating resins each of which has in turn been prepared by polymerizing primarily one or more of various unsaturated aromatic hydrocarbons such as styrene, α-methylstyrene, vinyl toluene, vinyl xylene, propenyl benzene, indene, methylindene and ethylindene and/or terpenes; and those obtained by hydrogenating resins each of which has in turn been prepared by polymerizing fractions having boiling points of 20°-300° C., especially, 150°-300° C. occurred as byproducts upon cracking or reformation of petroleum.

In the present invention, the amount of the hydrogenated petroleum resin to be used may vary depending on its softening point. It may however be used in an amount of 3-20 parts by weight, preferably, 4-12 parts by weight, more preferably, 5-10 parts by weight per 100 parts by weight of the polypropylene resin. If it is used in any amount less than 3 parts by weight, its improving effects of transparency and thermoformability cannot be exhibited fully. If it is employed in any amount greater than 20 parts by weight on the contrary, the thermoformability is deteriorated.

The softening point of the hydrogenated petroleum resin may be 100° C. or higher, preferably 124° C. or higher, most preferably 130° C. or higher. Here, the softening point means a value measured by the ring and ball method prescribed in JIS (Japanese Industrial Standard) K5902. If the softening point of the hydrogenated petroleum resin is lower than 124° C., the resulting sheet is extracted to a greater degree with n-HT unless either one of the special processes of this invention is followed. It is hence not desirable to use hydrogenated petroleum resins having such low melting points.

The sheet of this invention, which is suited for PT packages, can be obtained in the following manner. Namely, prescribed amounts of the above-mentioned polypropylene resin and hydrogenated petroleum resin are formed, if necessary or desired, together with a known polypropylene stabilizer into a resin composition, for example, by mixing them in a known mixer such as Henschel mixer and then pelletizing the resultant mixture through an extruder. The resin composition is then formed into a sheet, for example, by T-die extrusion, followed by annealing.

The formation of the sheet is carried out at a chill-roll temperature of at least 70° C. Owing to the adoption of this chill-roll temperature, the degree of extraction with n-HT can be reduced surprisingly. The chill-roll temperature is at least 70° C., preferably, 75°-25° C. Any temperatures lower than 70° C. cannot bring about sufficient effects, leading to a high degree of extraction with n-HT.

The thus-obtained sheet is then annealed, whereby the degree of its extraction with n-HT is lowered further. The annealing temperature is 50°-130° C., preferably, 80°-125° C. Any temperatures lower than 50° C. cannot bring about sufficient effects. On the other hand, the annealing time is at least 30 minutes, more preferably, at least 60 minutes. Any annealing time shorter than 30 minutes cannot bring about sufficient effects.

On the other hand, the multi-layered sheet of this invention which is also suitable for PT packages can be obtained in the following manner. Namely, prescribed amounts of the above-mentioned polypropylene resin and hydrogenated petroleum resin are formed, if necessary or desired, together with a known polypropylene stabilizer into a resin composition, for example, by mixing them in a known mixer such as Henschel mixer and then pelletizing the resultant mixture through an extruder. The resin composition is then subjected along with a polypropylene resin to co-extrusion or laminating, whereby the multi-layered sheet is obtained.

In this multi-layered polypropylene sheet for PT packages, the thickness of the base sheet formed of the polypropylene resin and hydrogenated petroleum resin may be at least 140 μm, preferably 140-340 μm, more preferably 240-290 μm. If the thickness is smaller than 140 μm, the resulting PT packages have low stiffness and high water vapor permeability.

Further, the thickness of the coating polypropylene layer must be at least 10 μm, preferably 10-30 μm, most preferably 15-20 μm. Any thickness smaller than 10 μm can exhibit substantially no n-HT extraction preventing ability. The transparency is however impaired if its thickness is too large.

The sheets of this invention, which are suited for PT packages, are excellent in water vapor resistance, transparency and safety and at the same time, superb in thermoformability upon PT packing. They can thus be successfully used on PT packing machines.

The polypropylene sheets of this invention, which are suited for PT packages, will hereinafter be described further by the following Examples and Comparative Examples.

EXAMPLE 1:

To 100 parts by weight of a homopolypropylene containing 0.1 part by weight of di-tert-butyl-p-cresol and 0.1 part by weight of calcium stearate and having an MI of 2, 10 parts by weight of a hydrogenated petroleum resin having a softening point of 123° C. were added. After mixing them in a Henschel mixer, the resulting mixture was extruded at 240° C. by means of an extruder having a barrel diameter of 40 mm so that pellets were obtained.

By using an extruder set at a chill-roll temperature of 80° C. and extrusion temperature of 240° C., equipped with a T-die and having a barrel diameter of 40 mm, those pellets were formed into a sheet the width and thickness of which were 200 mm and 0.25 mm respectively.

The sheet was then annealed at 80° C. for 40 minutes to obtain a polypropylene sheet for PT packages.

The formability of the sheet was evaluated by conducting PT packing with the sheet on a PT packing machine, "M 2000" (trade name) manufactured by Kanae Co., Ltd., Osaka, Japan. In addition, the transparency, water vapor permeability and degree of extraction with n-HT of the sheet were also measured. Results are shown in Table 1.

The transparency was determined by measuring the haze in accordance with ASTM D-1003. The water vapor permeability was measured in accordance with ASTM E-96. On the other hand, the degree of extraction with n-HT was measured in accordance with the n-HT extraction method prescribed in Notification No. 20 of the Ministry of Health and Welfare, Japanese Government, which will be described next.

A sample is cut into 10 cm square, placed in n-HT in an amount of 2 ml per cm² of the surface area of the sample, and then left over for 1 hour at 25° C. Thereafter, the sample is pulled out and the resulting n-HT solution is concentrated. The evaporation residue ($w_1$) is measured and the extracted amount (L) is calculated in accordance with the following equation: ps
$$L = w_1/w_0 \times 10^6 \text{ (ppm)}$$
in which $w_0$ means the weight of the sample subjected to the extraction. This value (L) is required not to exceed 150 ppm.

COMPARATIVE EXAMPLE 1:

A polypropylene sheet for PT packages was obtained in exactly the same manner as in Example 1 except for the omission of annealing. The formability and various physical properties of the thus-obtained sheet were evaluated. Results are given in Table 1.

EXAMPLES 2-3 & COMPARATIVE EXAMPLES 2:

Sheets were separately obtained in the same manner as in Example 1 except that annealing was conducted respectively for the time periods shown in Table 1. Results are given in Table 1.

TABLE 1

|  | Annealing time (min.) | Physical properties of sheet ||||
|---|---|---|---|---|---|
|  |  | Formability | Haze (%) | Water vapor permeability (g/m² · 24 hr) | Degree of extraction with n-HT (ppm) |
| Comp. Ex. |  |  |  |  |  |
| 1 | — | Good | 13 | 0.6 | 159 |
| 2 | 20 | Good | 13 | 0.6 | 156 |
| Example |  |  |  |  |  |
| 1 | 40 | Good | 13 | 0.6 | 148 |
| 2 | 120 | Good | 13 | 0.6 | 141 |
| 3 | 600 | Good | 13 | 0.6 | 124 |

EXAMPLES 4-5 & COMPARATIVE EXAMPLES 3-4:

Sheets were separately obtained in the same manner as in Example 2 except that annealing was conducted respectively at the temperatures shown in Table 2. Results are given in Table 2, along with results of Example 2.

TABLE 2

|  | Annealing temp. (°C.) | Physical properties of sheet ||||
|---|---|---|---|---|---|
|  |  | Formability | Haze (%) | Water vapor permeability (g/m² · 24 hr) | Degree of extraction with n-HT (ppm) |
| *3 | 40 | Good | 13 | 0.6 | 152 |
| Example |  |  |  |  |  |
| 4 | 50 | Good | 13 | 0.6 | 147 |
| 2 | 80 | Good | 13 | 0.6 | 141 |
| 5 | 100 | Good | 13 | 0.6 | 139 |
| *4 | 135 | Good | 45 | 0.6 | 138 |

*Comparative Example.

EXAMPLES 6-7 & COMPARATIVE EXAMPLE 5:

Sheets were separately obtained in the same manner as in Example 2 except that the chill-roll temperature was set respectively at the temperatures shown in Table 3. Results are given in Table 3, along with results of Example 2.

TABLE 3

|  | Chill-roll temp. (°C.) | Physical properties of sheet ||||
|---|---|---|---|---|---|
|  |  | Formability | Haze (%) | Water vapor permeability (g/m² · 24 hr) | Degree of extraction with n-HT (ppm) |
| *5 | 50 | Good | 13 | 0.6 | 152 |
| Example |  |  |  |  |  |
| 2 | 80 | Good | 13 | 0.6 | 141 |
| 6 | 100 | Good | 13 | 0.6 | 140 |
| 7 | 120 | Good | 13 | 0.6 | 138 |

*Comparative Example.

EXAMPLES 8-9 & COMPARATIVE EXAMPLES 6-7:

Sheets were separately obtained in the same manner as in Example 2 except that hydrogenated petroleum resins having the softening points given in Table 4 were used respectively in the amounts shown in shown in Table 4. Various physical properties and formability of the thus-obtained sheets were evaluated. Results are given in Table 4, along with results of Example 2.

The formability of the sheet was evaluated by conducting PT packing with the sheet on the PT packing machine, "M 2000" (trade name) manufactured by Kanae Co., Ltd., Osaka, Japan. In addition, the transparency, water vapor permeability and degree of ex-

TABLE 4

| | Hydrogenated petroleum resin | | Physical properties of sheet | | | |
|---|---|---|---|---|---|---|
| | Softening point (°C.) | Amount used (parts by weight) | Formabiltiy | Haze (%) | Water vapor permeability (g/m² · 24 hr) | Degree of extraction with n-HT (ppm) |
| Example | | | | | | |
| 2 | 123 | 10 | Good | 13 | 0.6 | 141 |
| 8 | 123 | 5 | Good | 15 | 0.8 | 35 |
| 9 | 130 | 18 | Good | 14 | 0.6 | 141 |
| Comp. Ex. | | | | | | |
| 6 | 123 | 2 | Poor | 27 | 1.2 | 10 |
| 7 | 123 | 25 | Poor | 13 | 0.6 | 270 |

Note:
The polypropylene resin was used in an amount of 100 parts by weight.

EXAMPLE 10:

After mixing 100 parts by weight of a homopolypropylene containing 0.1 part by weight of di-tert-butyl-p-cresol and 0.1 part by weight of calcium stearate and having an MI of 2 and 10 parts by weight of a hydrogenated petroleum resin having a softening point of 125° C. ["Alcon" (trade mark); product of Arakawa Chemical Industries, Ltd., Osaka, Japan] in a Henschel mixer, the resulting mixture was extruded at a preset temperature of 240° C. by means of an extruder having a barrel diameter of 40 mm so that a resin composition for base layers was obtained.

By using a sheet production apparatus which comprised two extruders having barrel diameters of 40 mm and 30 mm respectively, two sets of feed blocks and coathanger dies of different kinds arranged in an up-and-down relation, and a series of calender rolls, the above resin composition was fed to the extruder having the barrel diameter of 40 mm while the same homopropylene resin having an MI of 2 was fed to the extruder having the barrel diameter of 30 mm, whereby a sheet having a base layer of 230 μm thick and a coating layer of 20 μm thick and a total sheet thickness of 250 μm was produced.

traction with n-HT of the sheet were also measured. Results are shown in Table 5.

EXAMPLES 11-12 & COMPARATIVE EXAMPLE 8:

Sheets were separately produced in the same manner as in Example 10 except that the thicknesses of the base layer and coating layer were changed as shown in Table 5. Their physical properties were measured. Results are given in Table 5.

EXAMPLE 13:

A sheet was produced in the same manner as in Example 10 except that the thickness of the base layer was changed to 180 μm and the total sheet thickness was hence reduced to 200 μm. Its physical properties were measured. Results are given in Table 5.

EXAMPLES 14-15 & COMPARATIVE EXAMPLES 9-10:

Sheets were separately produced in the same manner as in Example 10 except that the polypropylene resin and hydrogenated petroleum resin were changed as shown in Table 5. Their properties were measured. Results are given in Table 5.

TABLE 5

| | Base Layer | | | | | Thickness of coating (μm) | Physical properties of sheet | | | |
|---|---|---|---|---|---|---|---|---|---|---|
| | Polypropylene | | HPR[1] | | Thickness (μm) | | Formability | Haze (%) | Water vapor permeability (g/m² · 24 hr) | Degree of extraction with n-HT (ppm) |
| | Type | MI[2] | SP (°C.)[3] | Amount used[4] | | | | | | |
| Example | | | | | | | | | | |
| 10 | HHP[5] | 2 | 125 | 10 | 230 | 20 | Good | 15 | 0.6 | 130 |
| 11 | HPP | 2 | 125 | 10 | 240 | 10 | Good | 14 | 0.6 | 143 |
| 12 | HPP | 2 | 125 | 10 | 220 | 30 | Good | 16 | 0.6 | 118 |
| *8 | HPP | 2 | 125 | 10 | 245 | 5 | Good | 14 | 0.6 | 152 |
| Example | | | | | | | | | | |
| 13 | HPP | 2 | 125 | 10 | 180 | 20 | Good | 13 | 0.8 | 143 |
| 14 | HPP | 2 | 125 | 5 | 230 | 20 | Good | 18 | 0.6 | 27 |
| 15 | HPP | 2 | 135 | 18 | 230 | 20 | Good | 15 | 0.6 | 120 |
| *9 | HPP | 2 | 125 | 2 | 230 | 20 | Poor | 28 | 1.2 | 10 |
| *10 Ex. | HPP | 2 | 125 | 25 | 230 | 20 | Poor | 14 | 0.6 | 340 |

TABLE 5-continued

| | Base Layer | | | | Thickness of coating (μm) | Physical properties of sheet | | | |
|---|---|---|---|---|---|---|---|---|---|
| | Polypropylene | | HPR[1] | | Thickness (μm) | | | Water vapor permeability (g/m² · 24 hr) | Degree of extraction with n-HT (ppm) |
| | Type | MI[2] | SP (°C.)[3] | Amount used[4] | | Formability | Haze (%) | | |
| 16 | RCP[6] | 1.5 | 125 | 10 | 230 | 20 | Good | 14 | 0.6 | 130 |

Note:
The polypropylene for the base layer was used in an amount of 100 parts by weight.
*Comparative Example.
[1]HPR: hydrogenated petroleum resin;
[2]unit: g/10 min;
[3]SP: softening point;
[4]unit: parts by weight;
[5]HPP: homopolypropylene;
[6]RCP: random propylene copolymer, which contained 2 wt. % of ethylene.

Polypropylene sheets of this invention, which are suited for PT packages, can be produced in the following manner.

Prescribed amounts of the above-described polypropylene resin and hydrogenated petroleum resin and if desired, fine silica powder and/or a polypropylene resin stabilizer are formed into a resin composition, for example, by mixing them in a mixer such as Henschel mixer and then pelletizing the resultant mixture through an extruder. The composition is then formed into a sheet by T-die extrusion. Here, it is essential to control the chill-roll temperature above 70° C. In this manner, the degree of extraction with n-HT is reduced surprisingly so that a sheet satisfying the standard set forth in Notification No. 20 of the Ministry of Health and Welfare, Japanese Government, that is, 150 ppm or less is obtained.

The chill-roll temperature must be at least 70° C., preferably, 75°–125° C. If it is lower than 75° C., the degree of extraction with n-HT increases.

As another process, may be mentioned to form the above-mentioned resin composition into a sheet by T-die extrusion or the like, followed by an annealing treatment. In this process, the annealing treatment is important after formation of the resin composition into the sheet. The annealing temperature is above 50° C., preferably, 80°–30° C. Any annealing temperatures lower than 50° C. cannot exhibit sufficient effects for the reduction of extraction with n-HT and the degree of extraction becomes greater. On the other hand, the annealing time is at least 30 minutes, more preferably, 60 minutes or longer. Annealing effects are insufficient if the annealing time is shorter than 30 minutes and the degree of extraction with n-HT becomes greater.

The processes of this invention, which are each suitable for the production of a polypropylene sheet for PT packages, will next be described further by the following Examples and Comparative Examples Example 17:

To 100 parts by weight of a homopolypropylene containing 0.1 part by weight of di-tert-butyl-p-cresol and 0.1 part by weight of calcium stearate and having an MI of 2, 10 parts by weight of a hydrogenated petroleum resin having a softening point of 125° C were added. After mixing them in a Henschel mixer, the resulting mixture was formed at a chill-roll temperature of 80° C. into a sheet by means of an extruder having a barrel diameter of 40 mm, thereby producing a sheet for PT packages. The width and thickness of the sheet were 200 mm and 0.25 mm respectively.

The formability of the sheet was evaluated by conducting PT packing with the sheet on the PT packing machine, "M 2000" (trade name) manufactured by Kanae Co., Ltd., Osaka, Japan. In addition, the transparency, water vapor permeability and degree of extraction with n-HT of the sheet were also measured. Results are shown in Table 1.

EXAMPLES 18–19 & COMPARATIVE EXAMPLE 11:

Sheets were separately formed in the same manner as in Example 17 except that the chill-roll temperature was set respectively at the temperatures shown in Table 6. Various physical properties and formability of the thus-obtained sheets were evaluated. Results are given in Table 6.

EXAMPLES 20–21 & COMPARATIVE EXAMPLES 12–13:

Sheets were separately obtained in the same manner as in Example 17 except that hydrogenated petroleum resins having the softening points given in Table 6 were used respectively in the amounts shown in shown in Table 6. Various physical properties and formability of the thus-obtained sheets were evaluated. Results are given in Table 6.

TABLE 6

| | Hydrogenated petroleum resin | | Chill-roll temperature (°C.) | Physical properties of sheet | | | |
|---|---|---|---|---|---|---|---|
| | Softening point (°C.) | Amount used (parts by weight) | | Formability | Haze (%) | Water vapor permeability (g/m² · 24 hr) | Degree of extraction with n-HT (ppm) |
| Example 17 | 125 | 10 | 80 | Good | 13 | 0.6 | 140 |
| Example 18 | 125 | 10 | 100 | Good | 13 | 0.6 | 135 |
| Example 19 | 125 | 10 | 120 | Good | 13 | 0.6 | 135 |
| Comp. Ex. 11 | 125 | 10 | 50 | Good | 13 | 0.6 | 160 |
| Example 20 | 125 | 5 | 80 | Good | 17 | 0.8 | 33 |
| Example 21 | 135 | 18 | 80 | Good | 14 | 0.6 | 130 |
| Comp. Ex. 12 | 125 | 2 | 80 | Poor | 27 | 1.2 | 11 |

TABLE 6-continued

| | Hydrogenated petroleum resin | | Chill-roll temperature (°C.) | Physical properties of sheet | | | |
|---|---|---|---|---|---|---|---|
| | Softening point (°C.) | Amount used (parts by weight) | | Formability | Haze (%) | Water vapor permeability (g/m² · 24 hr) | Degree of extraction with n-HT (ppm) |
| Comp. Ex. 13 | 125 | 25 | 80 | Poor | 13 | 0.6 | 350 |

Note:
The polypropylene resin was used in an amount of 100 parts by weight.

EXAMPLE 22:

To 100 parts by weight of a homopolypropylene containing 0.1 part by weight of di-tert-butyl-p-cresol and 0.1 part by weight of calcium stearate and having an MI of 2, 10 parts by weight of a hydrogenated petroleum resin having a softening point of 125° C. were added. After mixing them in a Henschel mixer, the resulting mixture was extruded at 240° C. by means of an extruder having a barrel diameter of 40 mm so that pellets were obtained.

By using an extruder equipped with a T-die and having a barrel diameter of 40 mm, those pellets were formed at 240° C. into a sheet the width and thickness of which were 200 mm and 0.25 mm respectively.

The sheet was then annealed at 80° C. for 120 minutes to obtain a sheet for PT packages.

The formability of the sheet was evaluated by conducting PT packing with the sheet on the PT packing machine, "M 2000" (trade name) manufactured by Kanae Co., Ltd., Osaka, Japan. In addition, the transparency, water vapor permeability and degree of extraction with n-HT of the sheet were also measured. Results are shown in Table 7.

EXAMPLES 23–24 & COMPARATIVE EXAMPLES 14–16:

Sheets were separately obtained in the same manner as in Example 22 except that the annealing temperature was change as shown in Table 7. Various physical properties and formability of the thus obtained sheets were evaluated. Results are given in Table 7.

EXAMPLES 25–27 & COMPARATIVE EXAMPLE 17:

Sheets were separately obtained in the same manner as in Example 22 except that the annealing time was change as shown in Table 7. Various physical properties and formability of the thus-obtained sheets were evaluated. Results are given in Table 7.

Examples 28–29 & COMPARATIVE EXAMPLES 18–19:

Sheets were separately obtained in the same manner as in Example 24 except that hydrogenated petroleum resins having the softening points given in Table 7 were used respectively in the amounts shown in shown in Table 7. Various physical properties and formability of the thus-obtained sheets were evaluated. Results are given in Table 7.

TABLE 7

| | HPR[1] | | Annealing | | | Physical properties of sheet | | |
|---|---|---|---|---|---|---|---|---|
| | Softening point (°C.) | Amount used (parts by weight) | Temp. (°C.) | Time (min.) | Formability | Haze (%) | Water vapor permeability (g/m² · 24 hr) | Degree of extraction with n-HT (ppm) |
| Example 22 | 125 | 10 | 80 | 120 | Good | 13 | 0.6 | 132 |
| Example 23 | 125 | 10 | 50 | 120 | Good | 13 | 0.6 | 142 |
| Example 24 | 125 | 10 | 100 | 120 | Good | 13 | 0.6 | 130 |
| Comp. Ex. 14 | 125 | 10 | 135 | 120 | Good | 45 | 0.6 | 130 |
| Comp. Ex. 15 | 125 | 10 | 40 | 120 | Good | 13 | 0.6 | 154 |
| Comp. Ex. 16 | 125 | 10 | — | — | Good | 13 | 0.6 | 160 |
| Example 25 | 125 | 10 | 80 | 60 | Good | 13 | 0.6 | 142 |
| Example 26 | 125 | 10 | 80 | 600 | Good | 13 | 0.6 | 115 |
| Example 27 | 125 | 10 | 80 | 1200 | Good | 13 | 0.6 | 115 |
| Comp. Ex. 17 | 125 | 10 | 80 | 20 | Good | 13 | 0.6 | 153 |
| Example 28 | 125 | 5 | 100 | 120 | Good | 17 | 0.8 | 35 |
| Example 29 | 135 | 18 | 100 | 120 | Good | 14 | 0.6 | 125 |
| Comp. Ex. 18 | 135 | 25 | 100 | 120 | Poor | 13 | 0.6 | 300 |
| Comp. Ex. 19 | 125 | 2 | 100 | 120 | Poor | 27 | 1.2 | 11 |

Note:
The polypropylene resin was used in an amount of 100 parts by weight.
[1]HPR: hydrogenated petroleum resin.

A resin composition suitable for use in the production of a polypropylene sheet for PT packages contains the above-described polypropylene and hydrogenated petroleum resin in the above-mentioned prescribed amounts. As the hydrogenated petroleum resin, is employed that having a softening point of at least 124° C., preferably, at least 130° C. This is because the degree of extraction with n-HT becomes higher if a hydrogenated petroleum resin having a softening point lower than 124° C. is used without following either one of the special processes of this invention.

Another resin composition also suitable for use in the production of a polypropylene sheet for PT packages contains the above-described polypropylene and hydrogenated petroleum resin in the above-mentioned prescribed amounts along with fine silica powder. As this fine silica powder, that having an average particle size of 5 μm or smaller, preferably 1 μm or smaller as measured by the settling method prescribed in JIS (Japanese Industrial Standard) Z8901 may be suitably employed. The smoothness of the sheet becomes poorer as the particle size of fine silica powder increases. Fine silica powder may be added in an amount of 0.05–1 part by weight, preferably, 0.1–0.5 part by weight per 100 parts by weight of the polypropylene resin. If fine silica powder is added in any amount smaller than 0.05 part by weight, its effects for the prevention of extraction of the hydrogenated petroleum resin with n-HT cannot be sufficiently exhibited. However, any amounts greater than 1 part by weight impair the transparency of the sheet.

These resin compositions may each be obtained, preferably, by mixing the polypropylene resin and hydrogenated petroleum resin or the polypropylene resin, hydrogenated petroleum resin and fine silica powder together with a polypropylene stabilizer in a known apparatus such as Henschel mixer and then pelletizing the resultant mixture by a known apparatus such as extruder.

The polypropylene resin compositions of this invention will hereinafter be specifically described by the following Examples and Comparative Examples:

EXAMPLES 30–33 & COMPARATIVE EXAMPLES 20–22:

To 100 parts by weight portions of a homopolypropylene containing 0.1 part by weight of di-tert-butyl-p-cresol and 0.1 part by weight of calcium stearate and having an MI of 2, hydrogenated petroleum resins having the softening points given in Table 8 were added respectively in their corresponding amounts shown in Table 8. After mixing each of the resultant batches separately in a Henschel mixer, the resulting mixtures were separately extruded at 240° C. by means of an extruder having a barrel diameter of 40 mm so that pellet samples were obtained.

By using an extruder equipped with a T-die and having a barrel diameter of 40 mm, those samples were separately formed at 240° C. into sheets so that sheets having a width of 200 mm and a thickness of 0.25 mm were obtained for PT packages.

The formability of each of the sheets was evaluated by conducting PT packing with the sheet on the PT packing machine, "M 2000" (trade name) manufactured by Kanae Co., Ltd., Osaka, Japan. In addition, the transparency, water vapor permeability and degrees of extraction with n-HT of the sheets were also measured. Results are shown in Table 8.

EXAMPLE 34:

Formability and various properties were investigated in the same manner as in Example 30 except that a random propylene copolymer having an MI of 1.5 and containing 2 wt. % of ethylene was used in lieu of the homopolypropylene. Results are shown in Table 8.

COMPARATIVE EXAMPLE 23:

Incidentally, for the sake of comparison, the water vapor permeability of a commercial sheet for PT packages, which was made of a hard vinyl chloride resin and had a thickness of 0.25 mm, was also measured. Its value was found to be 3.5 g/m².24 hrs. It was hence inferior to those produced from the polypropylene resin compositions of this invention.

TABLE 8

| | Polypropylene | | Hydrogenated petroleum resin | | | | Physical properties of sheet | |
|---|---|---|---|---|---|---|---|---|
| | Type | MI (g/10 min) | Softening point (°C.) | Amount used (wt. parts) | Form-ability | Haze (%) | Water vapor permeability (g/m² · 24 hr) | Degree of extraction with n-HT (ppm) |
| Example | | | | | | | | |
| 30 | HPP[1] | 2 | 126 | 10 | Good | 13 | 0.6 | 145 |
| 31 | HPP | 2 | 135 | 10 | Good | 14 | 0.6 | 80 |
| 32 | HPP | 2 | 126 | 5 | Good | 17 | 0.8 | 35 |
| 33 | HPP | 2 | 135 | 18 | Good | 14 | 0.6 | 148 |
| Comp. Ex. | | | | | | | | |
| 20 | HPP | 2 | 100 | 10 | Good | 13 | 0.6 | 240 |
| 21 | HPP | 2 | 126 | 2 | Poor | 27 | 1.2 | 12 |
| 22 | HPP | 2 | 126 | 25 | Poor | 13 | 0.6 | 400 |
| Ex. | | | | | | | | |
| 34 | RCP[2] | 1.5 | 126 | 10 | Good | 12 | 0.8 | 147 |

Note:
The polypropylene for the base layer was used in an amount of 100 parts by weight.
[1]HPP: homopolypropylene;
[2]random propylene copolymer containing 2 wt. % of ethylene.

EXAMPLES 35–40 & COMPARATIVE EXAMPLES 23–26:

To 100 parts by weight portions of a homopolypropylene containing 0.1 part by weight of di-tert-butyl-p-cresol and 0.1 part by weight of calcium stearate and having an MI of 2, hydrogenated petroleum resins having the softening points given in Table 9 and synthetic silica having an average particle size of 1 μm (product of Fuji-Davison Chemical, Ltd., Aichi, Japan) were added respectively in their corresponding amounts shown in Table 9. After mixing each of the resultant batches separately in a Henschel mixer, the resulting mixtures were separately extruded at 240° C. by means of an extruder having a barrel diameter of 40 mm so that pellet samples were obtained By using an extruder equipped with a T-die and having a barrel diameter of 40 mm, those samples were separately formed at 240° C. into sheets so that sheets having a width of 200 mm and a thickness of 0.25 mm were obtained for PT packages.

The formability of each of the sheets was evaluated by conducting PT packing with the sheet on the PT packing machine, "M 2000" (trade name) manufactured by Kanae Co., Ltd., Osaka, Japan. In addition, the transparency, water vapor permeability and degrees of extraction with n-HT of the sheets were also measured. Results are shown in Table 9.

TABLE 9

| | Polypropylene[1] | | HPR[4] | | Amount of added silica (wt. parts) | Physical properties of sheet | | | |
|---|---|---|---|---|---|---|---|---|---|
| | Type | MI[5] | Softening[2] point (°C.) | Amount used (wt. parts) | | Formability | Haze (%) | Water vapor permeability (g/m² · 24 hr) | Degree of extraction with n-HT (ppm) |
| Example | | | | | | | | | |
| 35 | HPP[6] | 2 | 125 | 10 | 0.1 | Good | 13 | 0.6 | 148 |
| 36 | HPP | 2 | 125 | 10 | 0.5 | Good | 14 | 0.6 | 140 |
| 37 | HPP | 2 | 125 | 10 | 0.8 | Good | 17 | 0.6 | 136 |
| 38 | HPP | 2 | 125 | 5 | 0.5 | Good | 18 | 0.8 | 30 |
| 39 | RCP[3] | 1.5 | 125 | 10 | 0.5 | Good | 13 | 0.8 | 143 |
| 40 | HPP | 2 | 135 | 18 | 0.5 | Good | 15 | 0.6 | 130 |
| Comp. Ex. | | | | | | | | | |
| 23 | HPP | 2 | 125 | 10 | 0 | Good | 13 | 0.6 | 160 |
| 24 | HPP | 2 | 125 | 10 | 1.2 | Good | 28 | 0.6 | 135 |
| 25 | HPP | 2 | 125 | 2 | 0.5 | Poor | 28 | 1.2 | 10 |
| 26 | HPP | 2 | 125 | 25 | 0.5 | Poor | 14 | 0.6 | 350 |

Note:
[1]The polypropylene for the base layer was used in an amount of 100 parts by weight.
[2]The softening point of each hydrogenated petroleum resin was measured by the ring and ball method of JIS (Japanese Industrial Standards) K-5902.
[3]RCP: random propylene copolymer containing 2 wt. % of ethylene.
[4]HPR: hydrogenated petroleum resin;
[5]unit: (g/10 min.);
[6]HPP: homopolypropylene.

What is claimed is:

1. A polypropylene sheet for press-through packages, said sheet being obtained by forming a polypropylene resin composition, which contains 3-20 parts by weight of a hydrogenated petroleum resin per 100 parts by weight of a polypropylene resin, into a sheet at a chill-roll temperature of at least 70° C. and then annealing the sheet at a temperature of 50°-130° C. for at least 30 minutes.

2. The polypropylene sheet as claimed in claim 1, wherein the polypropylene resin is a propylene homopolymer, propylene-ethylene copolymer or propylenebutene-1 copolymer.

3. The polypropylene sheet as claimed in claim 1, wherein the polypropylene resin has a melt flow index of 1-4 g/10 min.

4. The polypropylene sheet as claimed in claim 1, wherein the polypropylene resin composition contains the hydrogenated petroleum resin in an amount of 5-10 parts by weight per 100 parts by weight of the polypropylene resin.

5. A polypropylene sheet for press-through packages, said sheet being obtained by covering with a polypropylene layer of 10 μm thick or greater at least one side of a sheet obtained from a polypropylene resin composition containing 3 -20 parts by weight of a hydrogenated petroleum resin per 100 parts by weight of a polypropylene resin.

6. The polypropylene sheet as claimed in claim 5, wherein the softening point of the hydrogenated petroleum resin is at least 124° C.

7. The polypropylene sheet as claimed in claim 5, wherein the polypropylene resin is a propylene homopolymer, propylene-ethylene copolymer or propylene-butene-1 copolymer.

8. The polypropylene sheet as claimed in claim 5, wherein the polypropylene resin has a melt flow index of 1-4 g/10 min.

9. The polypropylene sheet as claimed in claim 5, wherein the polypropylene resin composition contains the hydrogenated petroleum resin in an amount of 5-10 parts by weight per 100 parts by weight of the polypropylene resin.

10. A process for the production of a polypropylene sheet for press-through packages, which comprises forming a polypropylene resin composition, which contains 3-20 parts by weight of a hydrogenated petroleum resin per 100 parts by weight of a polypropylene resin, into a sheet at a chill-roll temperature of at least 70° C.

11. A process for the production of a polypropylene sheet for press-through packages, which comprises extruding a polypropylene resin composition composed of 100 parts by weight of a polypropylene resin and 3-20 parts by weight of a hydrogenated petroleum resin and then annealing the extrudate at a temperature of at least 50° C. for at least 30 minutes.

12. A process as claimed in claim 11, wherein the softening point of the hydrogenated petroleum resin is at least 124° C.

13. A polypropylene resin composition for press-through packages, comprising 3-20 parts by weight of a hydrogenated petroleum resin having a softening point of at least 124° C. per 100 parts by weight of a polypropylene resin.

14. The polypropylene resin composition as claimed in claim 13, wherein the hydrogenated petroleum weight per 100 parts by weight of the polypropylene resin is contained in an amount of 5-10 parts by weight per 100 parts by weight of the polypropylene resin.

15. The polypropylene resin composition as claimed in claim 13, wherein the polypropylene resin is a propylene homopolymer, propylene-ethylene copolymer or propylene-butene-1 copolymer.

16. The polypropylene resin composition as claimed in claim 13, wherein the polypropylene resin has a melt flow index of 1-4 g/10 min.

17. A polypropylene resin composition for press-through packages, comprising 3-20 parts by weight of a hydrogenated petroleum resin and 0.05-1 part by weight of fine silica powder, both, per 100 parts by weight of a polypropylene resin.

18. The polypropylene resin composition as claimed in claim 17, wherein the polypropylene resin is a propylene homopolymer, propylene-ethylene copolymer or propylene-butene-1 copolymer.

19. The polypropylene resin composition as claimed in claim 17, wherein the polypropylene resin has a melt flow index of 1-4 g/10 min.

20. The polypropylene resin composition as claimed in claim 17, wherein the hydrogenated petroleum resin is contained in an amount of 5-10 parts by weight per 100 parts by weight of the polypropylene resin.

21. The polypropylene resin composition as claimed in claim 17, wherein the fine silica powder has an average particle size of 5 μm or smaller.

22. A process for production of a polypropylene sheet for press-through packages, which comprises forming a polypropylene resin composition, which contains 3-20 parts by weight of a hydrogenated petroleum resin having a softening point of at least 124° C. per 100 parts weight of a polypropylene resin, into a sheet at a chill-roll temperature of at least 70° C. and then annealing the sheet at a temperature of 50°-130° for at least 30 minutes.

23. A process as claimed in claim 22 wherein the polypropylene resin is a propylene homopolymer, propylene-ethylene copolymer or propylene-butene-1 copolymer.

24. A process as claimed in claim 22 wherein the polypropylene resin has a melt flow index of 1-4 g/10 min.

25. A process as claimed in claim 22 wherein the polypropylene resin composition contains the hydrogenated petroleum resin in an amount of 5-10 parts by weight per 100 parts by weight of the polyropylene resin.

* * * * *